United States Patent
Xiao et al.

(10) Patent No.: US 9,323,800 B2
(45) Date of Patent: Apr. 26, 2016

(54) AUTOMATIC NOTIFICATION OF DOCUMENT CHANGES

(75) Inventors: Lun Xiao, Cary, NC (US); John Raithel Hind, Raleigh, NC (US); Yongcheng Li, Cary, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 740 days.

(21) Appl. No.: 12/647,218

(22) Filed: Dec. 24, 2009

(65) Prior Publication Data

US 2011/0161425 A1 Jun. 30, 2011

(51) Int. Cl.
G06F 15/16 (2006.01)
G06F 17/30 (2006.01)

(52) U.S. Cl.
CPC .................. *G06F 17/30368* (2013.01)

(58) Field of Classification Search
USPC .......................................... 709/206
See application file for complete search history.

(56) References Cited

U.S. PATENT DOCUMENTS

| | | | |
|---|---|---|---|
| 6,631,363 B1 | 10/2003 | Brown et al. | |
| 6,775,658 B1 | 8/2004 | Zothner | |
| 7,130,885 B2 | 10/2006 | Chandra et al. | |
| 7,216,145 B2 | 5/2007 | Collings | |
| 7,305,402 B2 | 12/2007 | Hind et al. | |
| 7,434,202 B2 | 10/2008 | Kramer | |
| 7,568,151 B2 | 7/2009 | Bargeron et al. | |
| 2008/0140720 A1* | 6/2008 | Six et al. | 707/104.1 |
| 2008/0216056 A1 | 9/2008 | Bate | |
| 2008/0250035 A1* | 10/2008 | Smith et al. | 707/100 |
| 2008/0301228 A1 | 12/2008 | Flavin | |
| 2009/0044178 A1 | 2/2009 | Aridor et al. | |
| 2009/0049053 A1* | 2/2009 | Barker et al. | 707/10 |
| 2009/0204465 A1 | 8/2009 | Pradhan | |
| 2010/0030752 A1* | 2/2010 | Goldentouch | 707/3 |

OTHER PUBLICATIONS

Holmes, Walker, Promoting Developer-Specific Awareness, May 13, 2008.

* cited by examiner

*Primary Examiner* — Chris Parry
*Assistant Examiner* — Alan S Chou
(74) *Attorney, Agent, or Firm* — Grasso PLLC

(57) ABSTRACT

Included are method, article of manufacture, and device that serve to identify one or more tracked categories in a document, the tracked category representing a portion of the document, identify a change in one or more of the tracked categories of the document, identify a client to notify of the change in the tracked category, and send a notification to a client, where the notification provides notice that a change has occurred in a tracked category of a document.

26 Claims, 4 Drawing Sheets

AUTOMATIC NOTIFICATION OF DOCUMENT CHANGES

BACKGROUND

The field of invention involves revision notification broadcasting. More specifically, the invention involves providing timely notifications to targeted classes or individuals when modifications or revisions to monitored categories of an asset have occurred.

Effective team collaboration may be favored during the development of complex systems, such as software applications. Various parties may be part of the team involved in the development process. These parties can include architects/designers, system developers, testers, and users of the system. Open source project management frameworks may offer subscription services for these teams, and convert whole project update activities into notifications. For example, sourceforge.net offers its hosted projects the ability to offer notification to be sent to interested developers. These systems often serve to serve to flood subscribers with unfocused and uninteresting notifications.

Traditional document libraries and various distributed file systems may identify changed documents or files but suffer from a lack of specificity when sending notifications to interested team members. Likewise, other offerings, such as electronic mail software; electronic calendaring software; automated alarm or reminder programs, etc. also suffer from appropriate notice specificity.

BRIEF SUMMARY

As described herein, the invention may be embodied in various forms, including systems, devices, methods, and articles of manufacture. The embodiments provided herein are illustrative and not limiting, and may be adapted in-part or combined, all while staying within the spirit and scope of the invention.

In embodiments, a method may serve to provide participants or role administrators notice that a tracked category of a document/asset or a series of documents or assets has changed. In other words, changes made to a document may be monitored and notice automatically sent to others interested in receiving such notice. For example, programmers working on different documents may be notified of changes from other documents when the changes are relevant to the work being completed by the programmers. If user interface sections of code are changed, for instance, programmers working on user interface in other code may be notified as to the new changed interface code being used as are testers who maintain the respective test case documents for the modified user interface.

In a preferred embodiment, it may be suitable to dynamically adapt notification patterns to the changing landscape of the document/asset repository. In other words, as updates are sent to clients, these updates may be monitored and if patterns are identified, those patterns may be considered and accommodated when providing future updates to clients.

In embodiments, as changes in a document occur, this may serve to trigger notifications sent to clients. In certain embodiments, these triggers may be sent to groups previously expressing interest in the update. The updates may be sent to other groups as well. When sending these notifications a monitor may evaluate client subscription rules prior to sending the updates. These rules may provide that the update be delayed, gathered with others, be sent in a certain form, identify a single change or multiple changes, and be updated accordingly. As updates are identified or sent, monitors tracking and providing the notice may update the groups being notified as well as the document modifications that trigger the notices. Other modifications may be made as well.

Thus, embodiments include various dynamic systems, methods, and articles of manufacture directed to automatic notification of document changes. Network devices may include a controller programmed with instructions that cause it to carry out all or portions of the steps involving notification of document changes. Embodiments may also include a method wherein operating instructions at a controller cause one or more other controllers to carry out steps directed to making notifications regarding document changes. Likewise, embodiments may also include computer readable storage medium having stored thereon instructions, which, when executed by a controller, cause the controller to carry out methods or portions of methods directed to providing notifications of document revisions or updates.

DETAILED DESCRIPTION

Various embodiments of the invention are provided herein. The invention may be reflected in these embodiments, portions of these embodiments, combinations of these embodiments, and other embodiments as well.

As explained herein, embodiments include providing notification when portions of documents or other assets are modified or otherwise updated. This notification may include providing links to the document, or section of document, to multiple documents having the same tracked category, and to clients associated with the tracked category within the monitored document. The notification may also include providing emails, texts, feeds, or by using other media as well.

Figure 1:
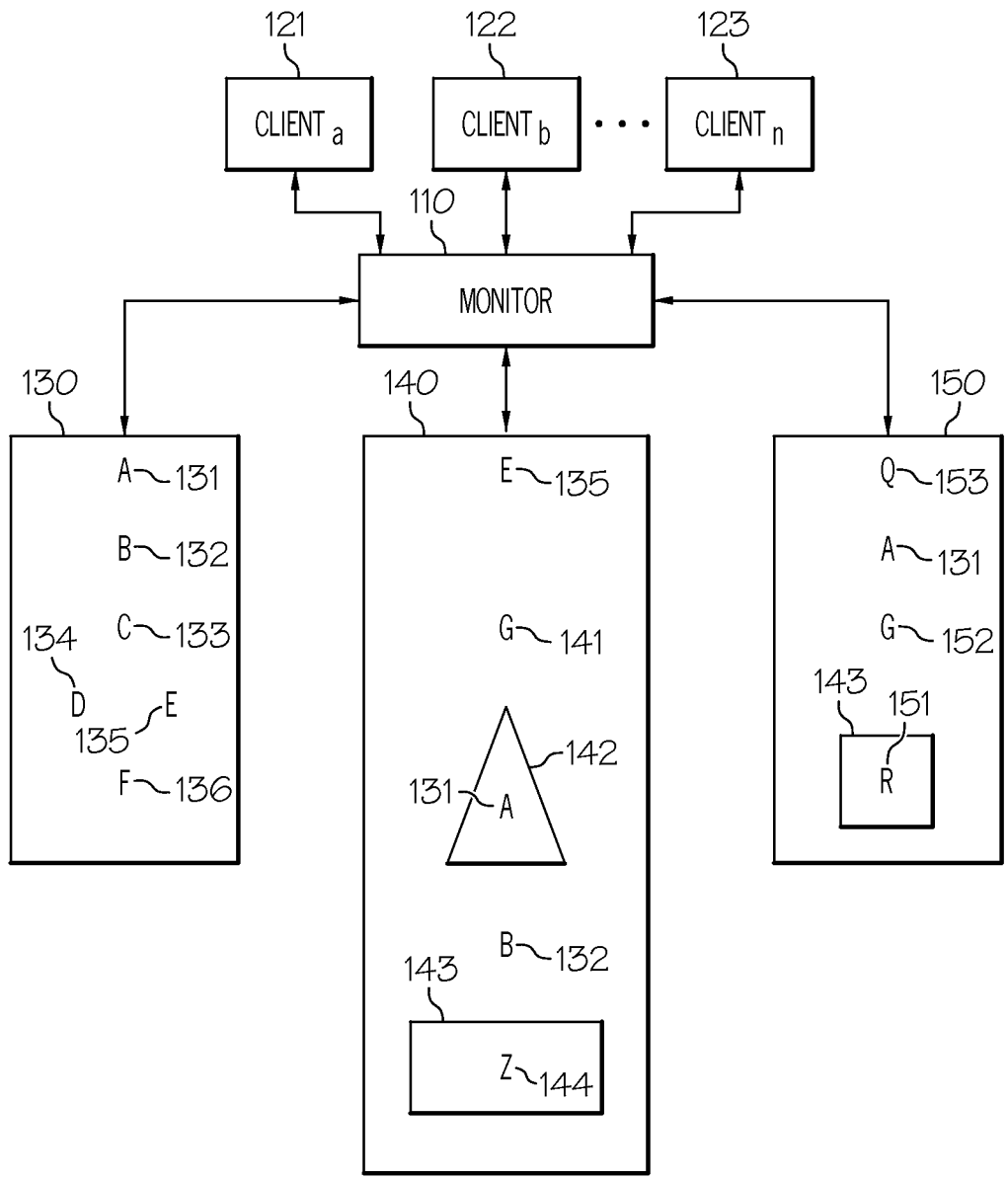
FIG. 1 shows a document dependency and automatic change notification system in accord with embodiments of the invention.

FIG. 1 shows documents 130-150, a monitor 110, and clients 121-123, as may be employed in embodiments of the invention. Document 130, includes tracked categories A-F (nos. 131-136). Document 140 includes tracked categories H 135, G 141, triangle 142, A 131, B 132, rectangle 143, and Z 144, while document 150 includes tracked categories Q 153, A 131, G 152, R 151, and rectangle 143.

In embodiments, the monitor 110 may monitor documents 130, 140, 150, for changes in one or more tracked categories. When a change is noted in a tracked category, the monitor 110 may send updates to clients identified to receive updates for the specific tracked category. In other words, in embodiments, having identified specific tracked categories in which individual clients are interested in receiving updates, the monitor, upon seeing changes of those tracked categories within a document, would notify the client that that specific document and a specific tracked category have been modified. This notification may also include a list of related or unrelated documents that also contain this tracked category. In so doing, the individual clients would receive focused updates on specific topics for a particular document in which there was previously expressed interest.

An advantage of the focused tracking in certain embodiments may include a reduction in updates received by a client, and more relevant updates being received by the client. As explained throughout, the monitor 110 may also send updates to clients based on analysis conducted by the monitor 110. This analysis may include watching client editing of a document and identified edited passages as categories of interest. This analysis may also include tracking updates sent to clients and tracking changes made within monitored documents, then, when patterns are identified during this tracking, adjustments as to when, how, and which clients are notified may be made by the monitor 110. Because of this pattern analysis, a client may receive updates on tracked changes without having previously identified interest in the particular tracked changes in which the monitor is now sending updates.

As noted in FIG. 1, the tracked categories may not be present in each monitored document and may also be present across several monitored documents. For example, tracked category A 131, is resident in document 130, document 140, and document 150. In addition, tracked category A 131 is also resident within tracked category triangle 142.

Tracked category A, embedded within triangle 142, shows that tracked categories may be standalone topics as well as subtopics or topics embedded within other tracked categories. The tracked categories may be created by individual clients, by the monitor 110, and by other systems as well. The categories may be created when the document itself is created as well as at other times, for example after being created by a monitor after the monitor determines that a new category should be created and tracked. Viewing or editing portions of a document by a client may also serve to create a tracked category for that client. Queries with certain words, phrases, word relationships, etc. may also be used to define or adjust a tracked category.

In embodiments, when a document is created, the user, a client, or other person, may be prompted to identify specific tracked categories therein. These tracked categories may be identified in various ways including swiping portions of the document content, using drop-down menus or other prompts to assist the client/user in identifying tracked categories in the document being created. As the document is created, the monitor 110 may refer the tracked categories to a database for further monitoring.

The documents shown in FIG. 1, as well as elsewhere within the application, may be various kinds of assets. These may include word processing documents, database documents, scripted code to be run by a microprocessor, server files, and various other kinds of assets/documents that are created and updated from time to time.

In embodiments, a client may be kept apprised of updates without necessarily needing to check in on the specific documents of interest for the client. Upon being informed of an update, a client may obtain a copy of the new updated document, may obtain copies of several documents containing that tracked category, maintain a copy of the tracked category or relevant subset of the document, or may take other actions as well.

Figure 2:
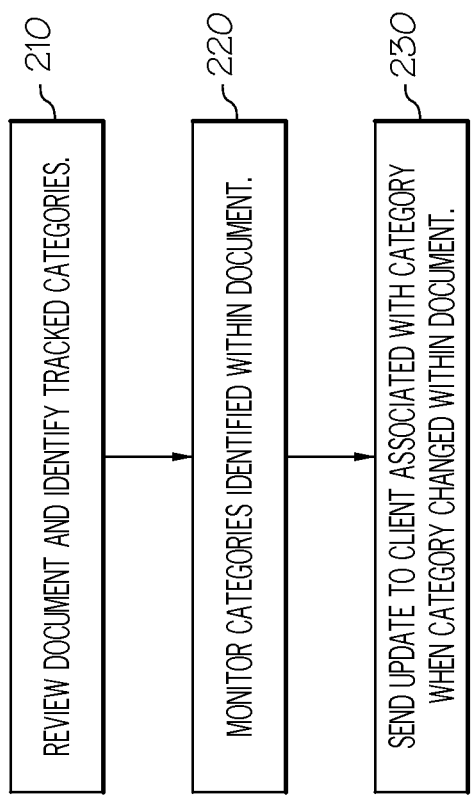
FIG. 2 shows a method in accord with embodiments of the invention.

FIG. 2 shows a method that may be employed for a class of documents. At 210, a monitor, may review a new document or document recently associated with the monitor 210 in order to identify tracked categories within the document. Having determined that the document contains categories to be tracked, the monitor 210 may associate the categories with that document in a database or may take other actions as well. When the monitor determines that a tracked category for the document has changed, as shown at 230, an update may be sent to a client associated with the particular tracked category.

Figure 3:
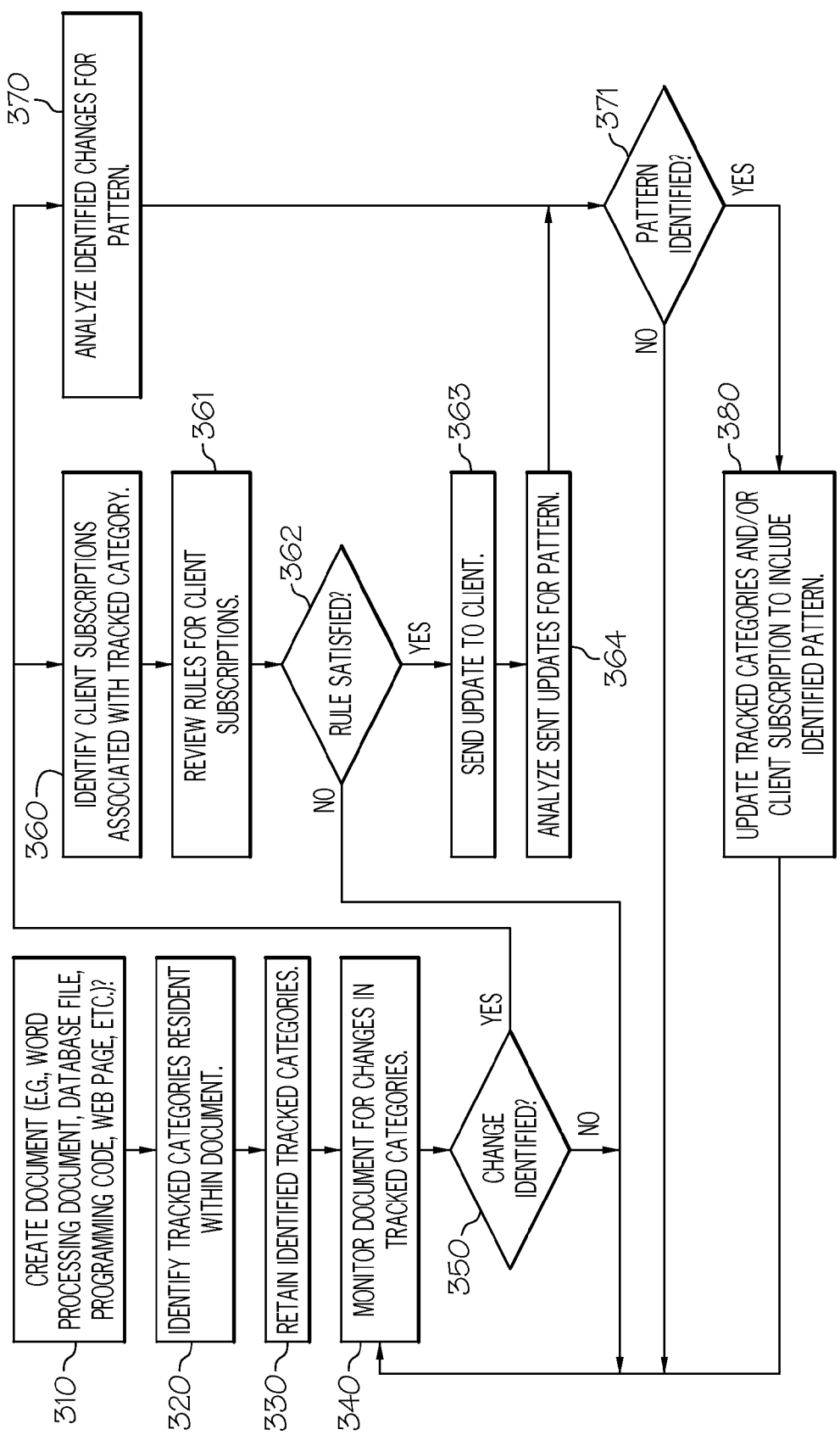
FIG. 3 shows a method of identifying changes and analyzing rules for subscriptions in accord with embodiments of the invention.

FIG. 3 shows a method in accordance embodiments. At 310 of FIG. 3, a document, such as a word processing document, database file, programming code, webpage, etc. may be created. At 320, tracked categories listed within the document may be identified. At 330, the identity of the tracked categories may be retained. At 330, a monitor, having been assigned to the particular document or a tracked category, may monitor the document for changes in tracked categories. If a change in the document is not identified at 350 then monitoring of the document as shown at 330, may continue. At 350, however, if the change is identified then client subscriptions associated with the tracked category may be identified 360 as well as patterns associated with the identified changes may also be evaluated and analyzed as shown at 370. After identifying client subscriptions at 360, client's descriptions may be reviewed at 361.

If these rules are satisfied at 362, an update may be sent to the client, as shown at 363. If the rules are not satisfied, then monitoring of the document for changes in tracked categories 340 may continue. The rules may include the time between previous updates sent, the quality of the update, the size of the update, or other criteria set by the client or the monitor. These criteria may be used to improve the quality of updates sent to the client.

After 363, sent updates may be analyzed for patterns as shown at 364. If the pattern is identified at 371 then updates may be made at the tracked categories and the client subscriptions to include the newly identified pattern, 380. If no pattern is identified at 371, then monitoring may continue by the monitor of the document.

Thus, as can be seen in FIG. 3, documents may be created and monitored for specific tracked categories, and when updates of this tracked category are identified, clients may be notified of these updates. In certain circumstances, clients may be notified of the updates based on rules set by the client as well as based on patterns identified by the monitor. A basis for making a correction to updates being sent to a client can be to improve the quality of the updates sent to the client, as well as to bundle updates to client such that a client receives a certain topics, or certain criteria, on particular days or in particular time periods. Other criteria may be set as well.

Figure 4:
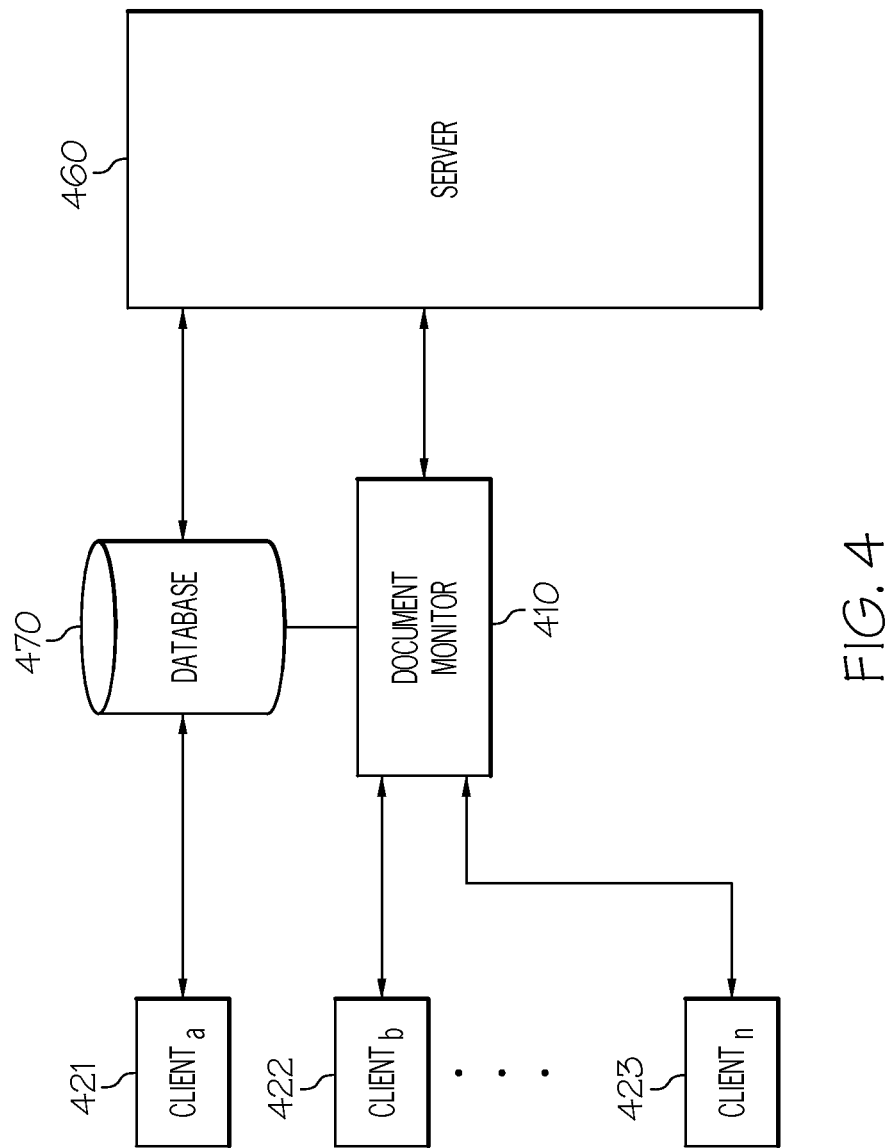
FIG. 4 shows a document dependency and automatic change notification system in accord with embodiments of the invention.

FIG. 4 shows a system as may be employed in embodiments. FIG. 4 includes a database 470, a document monitor 410, server 460, a client 421, a client 422, and a client 423. As shown in FIG. 4, the clients may be in communication with the database 470, and the document monitor 410. The document monitor 410, and the database 470, may also be in communication with each other, as well as with the server 460. The server 460 may hold the documents described herein, as well as information and/or instructions necessary for carrying out embodiment. The database 470 may hold rules and/or specific instructions to be carried out by the document monitor. The database 470 may be part of the document monitor 410 as well as a separate database removed from the document monitor 410. The database 470, as well as a server 460, may serve other purposes as well.

As described herein, when monitoring tracked categories, the document monitor 410 may be in communication with numerous clients including client 421, client 422, and client 423. The document monitor may also receive instructions from the clients in order to define or delineate tracked category updates that the clients are interested in receiving. The document monitor may store these instructions on the database 470 as well as with its own cache, and at other locations as well.

In embodiments, clients may serve certain roles associated with the document and the tracked categories. This role may include a user's task within a project at some point in time, such as Portal Administration Development, Portal Functional Testing, Portal API Design, etc. In embodiments, a client may have multiple roles but typically is acting in one of these at a time.

Consistent with above, the word document is used herein as regarding any kind of document. These may include Open Office Word, presentation slides, text, PDF, program source code, test case scripts, etc.

In embodiments, updating the tracked categories may include defining a relationship between a client and a document. These relationships may establish that one or many clients depend on a document and should be notified when a tracked category of the document changes. In embodiments clients may swipe sections of documents as notifications to monitors to identify changes in the tracked categories of the document. The monitor may search and identify tracked categories or changes to those categories by building search queries to evaluate whether a change has occurred. These queries may search for word distance and repetition within a document, they may also search for paragraph rearrangement or other changes versus previous versions of a document. If minimum thresholds are not met, triggers indicating a change in the tracked category of the document may not be satisfied. Other criteria may be used as well to limit hits and subsequent notifications to clients of changes in tracked categories.

The tracked categories associated with a client's subscription may be established or updated using the viewing pattern of the client. In other words, as a client views a document, the parts of the document viewed may be included in a tracked category associated with the client. This tracked category may also be associated with collaborators who act in a role declared or determined to be active at the time the tracking occurs.

In embodiments, rather than map client interest to a specific document or document content subsets, client interest in tracked categories may be expressed as patterns that are mapped across all of a repositories' content (e.g., a file server, web server, database, etc.). This means that if a paragraph containing a tracked category is moved or copied from one document to another, the interested clients (whether people or responsibilities) may be notified. For example, Websphere Application Server (WAS) Admin UI testers only depend on the UI portions of the WAS design document. When that portion of the documents is modified, testers may be notified to decide if the testing plan needs to be updated. In embodiments, testers may identify sections of the design documents that deal with UI consideration as they construct the test plan and thereby construct a notification pattern derived from this highlighted material. When a designer adds or modifies UI related material the pattern triggers a change in a tracked category as the document is updated in the repository and a notification goes out to those clients who are currently associated with the tester role.

As notification patterns may be independent of a specific content, they can be applied to new documents or to added content within existing documents. This can have the effect that the quality of notifications may be highly enhanced, reducing or removing SPAM-like quality from the traditional notification process, where such changes would trigger notices because the system had no way of interpreting the meaning of the added content.

In embodiments the document monitors may be implemented for some or all tracked categories. Rules may be in place for certain client subscriptions as well. As monitoring continues, each time a document is added or changed it may be indexed with an appropriate search engine crawler, and an index, database, cache, etc., may be updated. At appropriate times, including immediately as well as in a batch process, queries may be run and the appropriate clients may be notified by sending the appropriate clients document links and snippets of text/code.

The following a sample of an exemplary embodiment. A component level design document specifies the following API class:

```
public SalesOrder {
    String orderNumber; String customerName; String orderDescription;
    SalesOrder(String customerName, String orderDescription); String
    getOrderNumber( );
    String getCustomerName( );
}
```

When this document is created, an index is given to this class. A tester writes test scenarios that test these APIs; Scenario 1: create a SalesOrder with a customer name and an order description; Scenario 2: get an order using a customer name. At the same time, the tester opens the design document and identifies the class and marks this section of document with his/her name and roles. Now this tester becomes a client for this section of document. This information is maintained by the Monitoring System, and it may be used to notify clients that this section of document is changed.

Later the author of the design document changes the document as follows: public

```
SalesOrder {
    String orderNumber;
    String customerName;
    String orderDescription;
    SalesOrder(String customerName, String orderDescription, String
    phoneNumber);
    String getOrderNumber( );
    String getCustomerName( );
}
```

When the document is saved, the Monitor identifies the changes and a change notification is generated. An index associated with this section may be used to query the clients of this section and the notification is sent to the clients. As a result, the tester may receive the notification and changes his/her test scenarios to include "phoneNumber" as a parameter.

As will be appreciated by one skilled in the art, the present invention may be embodied as a system, method or computer program product. Accordingly, the present invention may take the form of an entirely hardware embodiment, an entirely software embodiment (including firmware, resident software, micro-code, etc.) or an embodiment combining software and hardware aspects a basis may all generally be referred to herein as a "circuit," "module" or "system." Furthermore, the present invention may take the form of a computer program product embodied in any tangible medium of expression having computer-usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present invention is described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a," "an" and "the" are intended to include plural forms as well, unless the context clearly indicates otherwise. It will be further understood that the terms "comprises" and/or "comprising," when used in this specification, specific the presence of stated features, integers, steps, operations, elements, and/or components, but do not preclude the presence or addition of one or more other features, integers, steps, operation, elements, components, and/or groups thereof.

The corresponding structures, material, acts, and equivalents of all means or steps plus function elements in the claims below are intended to include any structure, material or act for performing the function in combination with other claimed elements are specifically claimed. The description of the present invention has been presented for purposes of illustration and description, but is not intended to be exhaustive or limited to the invention in the form disclosed. Many modifications and variations will be apparent to those of ordinary skill without departing from the scope and spirit of the invention. The embodiments were chosen and described in order to best explain the principles of the invention and the practical application, and to enable others of ordinary skill in the art to understand the invention for embodiments with various modifications as are suited to the particular use contemplated.

What is claimed is:

1. A method of providing selective notifications to clients, the method comprising:
   identifying, using a notification system, one or more tracked categories resident in an end user document, the tracked category representing a portion of existing textual content of the document residing within the document;
   identifying a change in one or more of the tracked categories of the document by monitoring activity regarding the portion of existing textual content;

identifying a client to notify of the change in the tracked category; and sending a notification to a client, the notification providing notice that a change has occurred in a tracked category of the document, wherein a client establishes a subscription to receive updates when a tracked category changes, the subscription being established by identifying portions of a document while the document is being edited.

2. The method of claim 1 wherein the notification includes one or more of: a link to the document, or a description of the changed tracked category, or the title of the tracked category, or a link to other documents containing the tracked category.

3. The method of claim 1 wherein a microprocessor is identifying a change in one of more of the tracked categories and wherein identifying includes conducting a search query using one or more search terms and wherein the document is one or more of the following: a presentation slide, a word processor file, a text file, a portable document file (PDF), source code, or text case script.

4. The method of claim 1 wherein the notification includes at least a portion of the tracked category or a link to the document or the tracked category.

5. The method of claim 1 further comprising:
reviewing sent notifications;
identifying a pattern in the reviewed sent notifications; and
after identifying a pattern, updating a client list by associating one or more clients to a tracked category.

6. The method of claim 1 wherein a microprocessor identifies one or more tracked categories and further comprising:
associating a client to a tracked category using viewing history or viewing pattern of the client within a set of documents being monitored for changing tracked categories.

7. The method of claim 1 wherein the tracked category includes one or more of the following: edited passages of text, changes in word relationships, client selected document section, word repetition within a document, paragraph rearrangement, and an object class.

8. The method of claim 1 further comprising:
determining whether an update rule has been satisfied before sending an update to a client.

9. The method of claim 8 wherein the update rule comprises: the time between previously sent updates or the size of the update or a criteria set by a client or a criteria set by a monitor.

10. A system comprising:
a monitor, the monitor being in communication with memory, a database, and one or more clients,
the monitor configured to execute first instructions that cause the monitor to
identify one or more tracked categories resident in an end user document, the tracked category representing a portion of the existing textual content of the document residing within the document;
identify a change in one or more of the tracked categories of the document by monitoring activity regarding the portion of existing textual content;
identify a client to notify of the change in the tracked category; and
send a notification to a client, the notification providing notice that a change has occurred in a tracked category of the document,
wherein the monitor is also configured to receive second instructions from a client to establish a subscription, the second instructions including identifying portions of a document while the document is being edited.

11. The system of claim 10 wherein the notification includes one or more of: a link to the document, or a description of the changed tracked category, or the title of the tracked category, or a link to other documents containing the tracked category.

12. The system of claim 10 wherein identifying one or more tracked categories includes conducting a search query using one or more search terms and wherein the document is one or more of the following: a presentation slide, a word processor file, a text file, a portable document file (PDF), source code, or text case script.

13. The system of claim 10 wherein the notification includes at least a portion of the tracked category or a link to the document or the tracked category.

14. The system of claim 10 wherein the monitor is further configured to:
review sent notifications;
identify a pattern in the reviewed sent notifications; and
after identifying a pattern, update a client list by associating one or more clients to a tracked category.

15. The system of claim 10 wherein the monitor is further configured to identify one or more tracked categories, and to associate a client to a tracked category using viewing history or viewing pattern of the client within a set of documents being monitored for changing tracked categories.

16. The system of claim 10 wherein the tracked category includes one or more of the following: edited passages of text, changes in word relationships, client selected document section, word repetition within a document, paragraph rearrangement, and an object class.

17. The system of claim 10 wherein the instructions further cause the monitor to:
determine whether an update rule has been satisfied before sending an update to a client.

18. The system of claim 17 wherein the update rule comprises: the time between previously sent updates or the size of the update or a criteria set by a client or a criteria set by a monitor.

19. An article of manufacture comprising:
a non-transitory computer readable storage medium, the storage medium containing first instructions, which when executed, cause a microprocessor to
identify one or more tracked categories resident in an end user document, the tracked category representing a portion of the existing textual content of the document residing within the document;
identify a change in one or more of the tracked categories of the document by monitoring activity regarding the portion of existing textual content;
identify a client to notify of the change in the tracked category; and
send a notification to a client, the notification providing notice that a change has occurred in a tracked category of the document,
wherein the first instructions, which when executed, also cause the microprocessor to receive second instructions from a client to establish a subscription, the second instructions including identifying portions of a document while the document is being edited.

20. The article of manufacture of claim 19 wherein the notification includes one or more of: a link to the document, or a description of the changed tracked category, or the title of the tracked category, or a link to other documents containing the tracked category.

21. The article of manufacture of claim 19 wherein identifying one or more tracked categories includes conducting a search query using one or more search terms.

22. The article of manufacture of claim 19 wherein the notification includes at least a portion of the tracked category or a link to the document or the tracked category.

23. The article of manufacture of claim 19 wherein the instructions also serve to further configure a microprocessor to:
   review sent notifications;
   identify a pattern in the reviewed sent notifications; and
   after identifying a pattern, update a client list by associating one or more clients to a tracked category.

24. The article of manufacture of claim 19 wherein the tracked category includes one or more of the following: edited passages of text, changes in word relationships, client selected document section, word repetition within a document, paragraph rearrangement, and an object class.

25. The article of manufacture of claim 19 wherein the instructions, which when executed, further cause the microprocessor to:
   determine whether an update rule has been satisfied before sending an update to a client.

26. The article of manufacture of claim 25 wherein the update rule comprises: the time between previously sent updates or the size of the update or a criteria set by a client or a criteria set by a monitor.

* * * * *